United States Patent
Zou et al.

(10) Patent No.: US 12,447,714 B1
(45) Date of Patent: Oct. 21, 2025

(54) ELECTRONIC DEVICES WITH LIGHT-EMITTING FABRICS

(71) Applicant: Apple Inc., Cupertino, CA (US)

(72) Inventors: Yi Zou, Cupertino, CA (US); Vedant A Dhandhania, San Jose, CA (US); Danning Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/500,961

(22) Filed: Nov. 2, 2023

Related U.S. Application Data

(60) Provisional application No. 63/426,585, filed on Nov. 18, 2022.

(51) Int. Cl.
| | |
|---|---|
| *B32B 5/02* | (2006.01) |
| *B32B 27/06* | (2006.01) |
| *B32B 27/12* | (2006.01) |
| *D03D 15/547* | (2021.01) |
| *G02B 27/01* | (2006.01) |
| *G06F 1/16* | (2006.01) |

(52) U.S. Cl.
CPC ............ *B32B 5/024* (2013.01); *B32B 27/065* (2013.01); *B32B 27/12* (2013.01); *D03D 15/547* (2021.01); *G02B 27/0176* (2013.01); *G06F 1/163* (2013.01); *B32B 5/026* (2013.01); *B32B 2307/40* (2013.01); *B32B 2437/04* (2013.01); *B32B 2457/20* (2013.01); *D10B 2401/18* (2013.01); *D10B 2401/20* (2013.01)

(58) Field of Classification Search
None
See application file for complete search history.

(56) References Cited

U.S. PATENT DOCUMENTS

| | | | |
|---|---|---|---|
| 7,682,034 B2 | 3/2010 | Asvadi et al. | |
| 9,521,885 B2 | 12/2016 | Weber et al. | |
| 11,150,692 B2 | 10/2021 | Wang et al. | |
| 11,156,842 B2 | 10/2021 | Ellis et al. | |
| 11,453,332 B2 | 9/2022 | Erler et al. | |
| 2012/0327651 A1 | 12/2012 | Cornelssen et al. | |
| 2018/0260052 A1* | 9/2018 | Karagozler | A41D 3/00 |
| 2019/0243145 A1* | 8/2019 | Ellis | D04B 1/22 |

FOREIGN PATENT DOCUMENTS

WO      2012060524 A1    5/2012

* cited by examiner

*Primary Examiner* — Stephen T. Reed
(74) *Attorney, Agent, or Firm* — Treyz Law Group, P.C.; Kendall P. Woodruff

(57) ABSTRACT

A head-mounted device may include a housing with a display that displays images that are viewable from an eye box. A light seal may be coupled the housing and may block outside light from reaching the eye box. The light seal may include a light-emitting fabric. The light-emitting fabric may include light-emitting devices such as light-emitting diodes and/or light guides that produce visual output on the light seal and/or on other portions of the head-mounted device. The visual output may be coordinated with images on the display. Light guides may have light-scattering structures that allow light to escape from the light guides and thereby form illuminated regions on the light-emitting fabric. The light-scattering structures may be aligned with openings in the fabric. Light-emitting diodes may be mounted to the fabric or may emit light through openings in the fabric.

20 Claims, 11 Drawing Sheets

ELECTRONIC DEVICES WITH LIGHT-EMITTING FABRICS

This application claims the benefit of provisional patent application No. 63/426,585, filed Nov. 18, 2022, which is hereby incorporated by reference herein in its entirety.

FIELD

This relates generally to fabric and, more particularly, to fabric for wearable electronic devices such as head-mounted devices.

BACKGROUND

Electronic devices such as head-mounted devices are configured to be worn on a head of a user. A head-mounted device may have left and right optical systems for presenting images to a user's left and right eyes. The optical systems may be mounted in a head-mounted housing. Conventional head-mounted devices may not provide a satisfactory user experience.

SUMMARY

A head-mounted device may include a main housing portion with displays that display images and optical modules through which the images are viewable from eye boxes. A light seal (sometimes referred to as a face frame) may be coupled to the main housing portion and may surround the eye boxes to prevent outside light from reaching the viewing area of the head-mounted device.

The light seal may include inner and outer fabric layers, a face portion that rests against the user's face, and a nose bridge portion that accommodates the user's nose. The outer fabric layer may be a seamless tube of knit fabric that forms an outermost layer of the light seal. The inner fabric layer may be a light-blocking fabric that lines the inner surface of the seamless tube of knit fabric.

The light seal may include a light-emitting fabric. The light-emitting fabric may include light-emitting devices that produce visual output on the light seal and/or on other portions of the head-mounted device. The visual output may be viewable from the eye box by a user wearing the head-mounted device or may be emitted in a direction away from the eye box for viewing by users that are not wearing the head-mounted device. The visual output may be coordinated with images on the head-mounted display, may provide feedback for user input such as touch input, voice input, button input, or other user input, may provide status indicator output, may provide information about the content being watched on the head-mounted display, status information associated with the head-mounted device, or status information associated with the user wearing the head-mounted device, and/or may provide other information.

The light-emitting fabric may include light guides such as fiber-optic light guides that are attached to the fabric or that form part of the fabric by interlacing with other strands in the fabric. The light guides may have light-scattering structures that allow light to escape from the light guides and thereby form illuminated regions on the light-emitting fabric. The light-scattering structures may be aligned with openings in the fabric. Light-emitting diodes may be mounted directly to strands in the fabric or may emit light through openings in the fabric.

DETAILED DESCRIPTION

An electronic device such as a head-mounted device may have a front face that faces away from a user's head and may have an opposing rear face that faces the user's head. The head-mounted device may include a main housing portion with displays that display images and optical modules through which the images are viewable from eye boxes. A face frame that is coupled to the main housing portion may form a light seal around the eye boxes. The light seal may help block outside light from reaching the viewing area of the head-mounted device. The light seal may include inner and outer fabric layers, a face portion that rests against the user's face, and a nose bridge portion that accommodates the user's nose. The outer fabric layer may be a seamless tube of knit fabric that forms an outermost layer of the light seal. The inner fabric layer may be a light-blocking fabric that lines the inner surface of the seamless tube of knit fabric.

The head-mounted device may be provided with light-emitting fabric by incorporating light-emitting devices into one or more fabric layers of the head-mounted device. The light-emitting devices may be used to form a status indicator, a display, or other illuminated region on the outer fabric layer of the head-mounted device. The outer fabric layer may be removable (e.g., to allow for washing or to switch with another fabric layer) or may be fixed to the head-mounted device. The outer fabric layer may cover one or more layers of foam or may be formed from a spacer fabric that provides sufficient cushion without requiring foam. The visual output on the light-emitting fabric may be coordinated with display content on the head-mounted display, or the visual output may be adjusted independently of the display content on the head-mounted display. The visual output on the light-emitting fabric may be viewable from the eye box by a user wearing the head-mounted device, or the visual output may be directed away from the eye box for viewing by users who are not wearing the head-mounted device.

The light-emitting devices may include light guides (e.g., optical fibers) that form strands in the outer layer of fabric, light guides that are attached to an outer surface of the fabric, light-emitting diodes that emit light through openings in the fabric or that are mounted to strands of the fabric, light guide films that guide light via total internal reflection and that scatter the light through the fabric, and/or any other suitable light-emitting devices.

Figure 1:
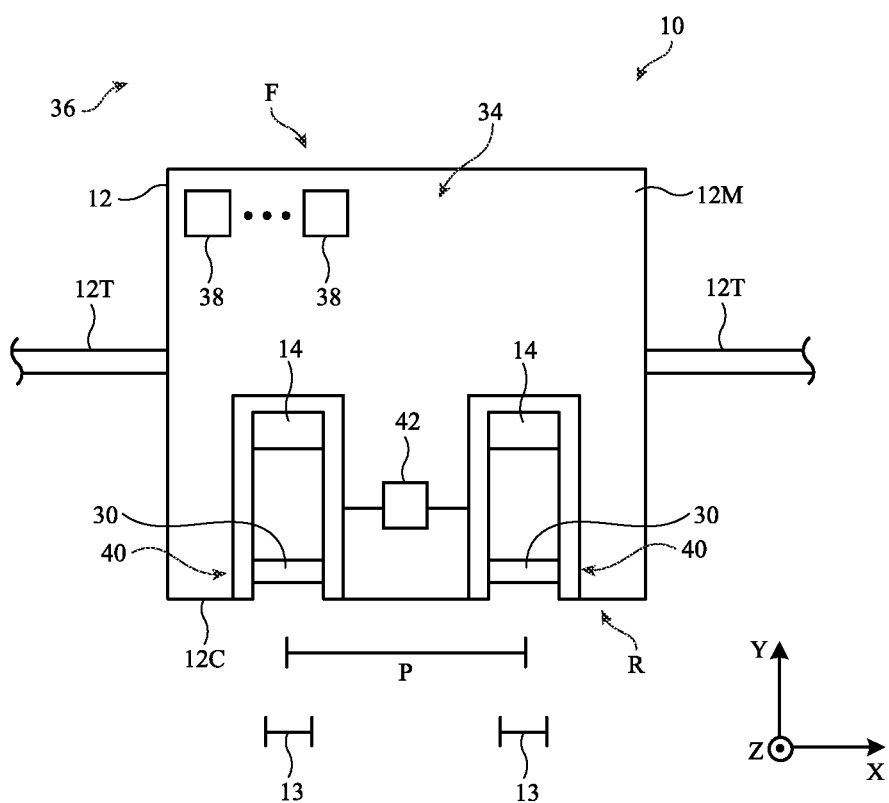
FIG. 1 is a top view of an illustrative head-mounted device in accordance with an embodiment.

A top view of an illustrative head-mounted device that may include light-emitting fabric is shown in FIG. 1. As shown in FIG. 1, head-mounted devices such as electronic device 10 may have head-mounted support structures such as housing 12. Housing 12 may include portions (e.g., support structures 12T) to allow device 10 to be worn on a user's head. Support structures 12T (sometimes referred to as temple housing structures or temple housing portions) may be formed from fabric, polymer, metal, and/or other material. Support structures 12T may form a strap or other head-mounted support structures that help support device 10 on a user's head. Some or all of temple housing portions 12T may overlap a user's temples when device 10 is worn on the user's head. A main support structure (e.g., main housing portion 12M) of housing 12 may support electronic components such as displays 14. Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as curtain 12C. In an illustrative configuration, curtain 12C includes a fabric layer that separates interior region 34 from the exterior region to the rear of device 10. Other structures may be used in forming curtain 12C, if desired. The presence of curtain 12C on rear face R may help hide internal housing structures, internal components 38, and other structures in interior region 34 from view by a user.

Device 10 may have left and right optical modules 40. Each optical module may include a respective display 14, lens 30, and support structure 32. Support structures 32, which may sometimes be referred to as lens barrels or optical module support structures, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30. Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images. Lenses 30 may include one or more lens elements for providing image light from displays 14 to respective eyes boxes 13. Lenses may be implemented using refractive glass lens elements, using mirror lens structures (catadioptric lenses), using holographic lenses, and/or other lens systems. When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

Not all users have the same interpupillary distance P. To provide device 10 with the ability to adjust the interpupillary spacing between modules 40 along lateral dimension X and thereby adjust the spacing P between eye boxes 13 to accommodate different user interpupillary distances, device 10 may be provided with one or more actuators 42. Actuators 42 can be manually controlled and/or computer-controlled actuators (e.g., computer-controlled motors) for moving support structures 32 relative to each other.

Figure 2:
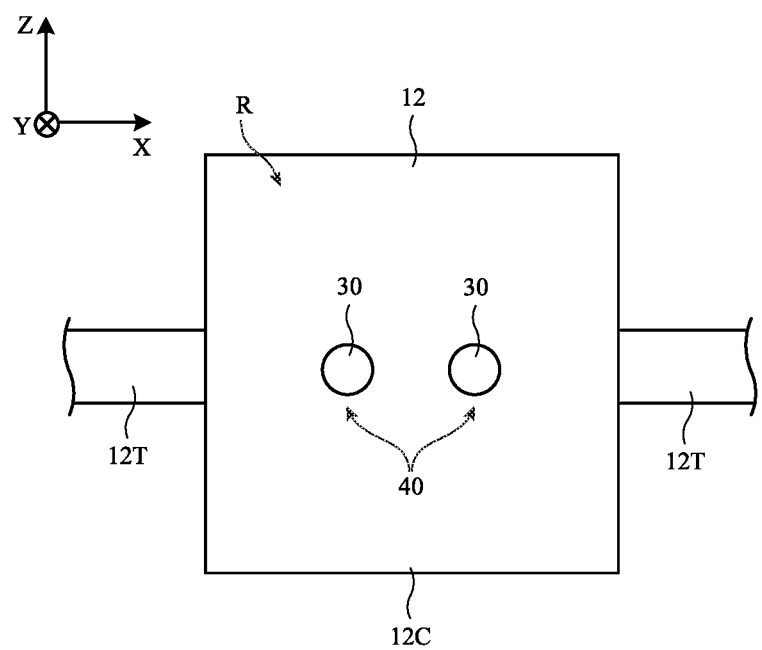
FIG. 2 is a rear view of an illustrative head-mounted device in accordance with an embodiment.

As shown in FIG. 2, curtain 12C may cover rear face F while leaving lenses 30 of optical modules 40 uncovered (e.g., curtain 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other. To prevent undesired wrinkling and buckling of curtain 12C as optical modules 40 are moved relative to rigid portions of housing 12M and relative to each other, a fabric layer or other cover layer in curtain 12C may be configured to slide, stretch, open/close, and/or otherwise adjust to accommodate optical module movement.

Figure 3:
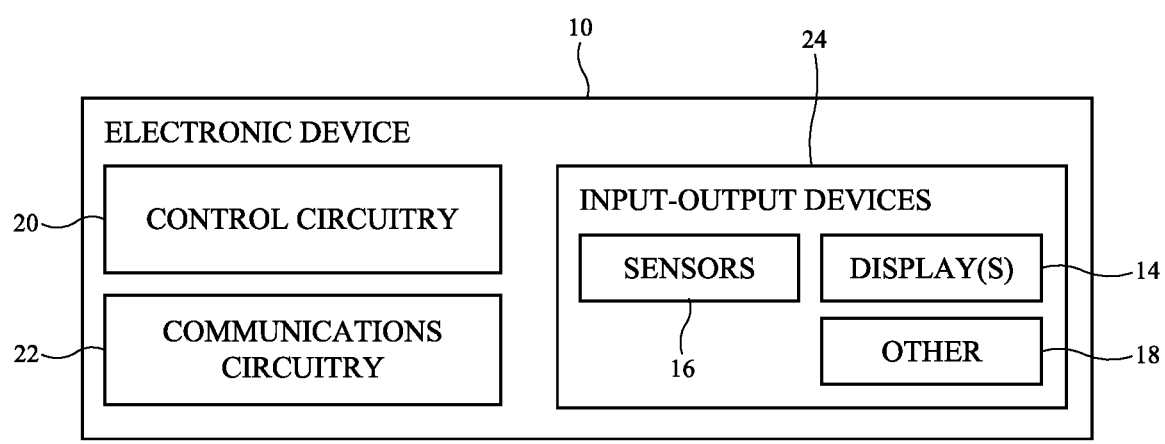
FIG. 3 is a schematic diagram of an illustrative head-mounted device in accordance with an embodiment.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 4:
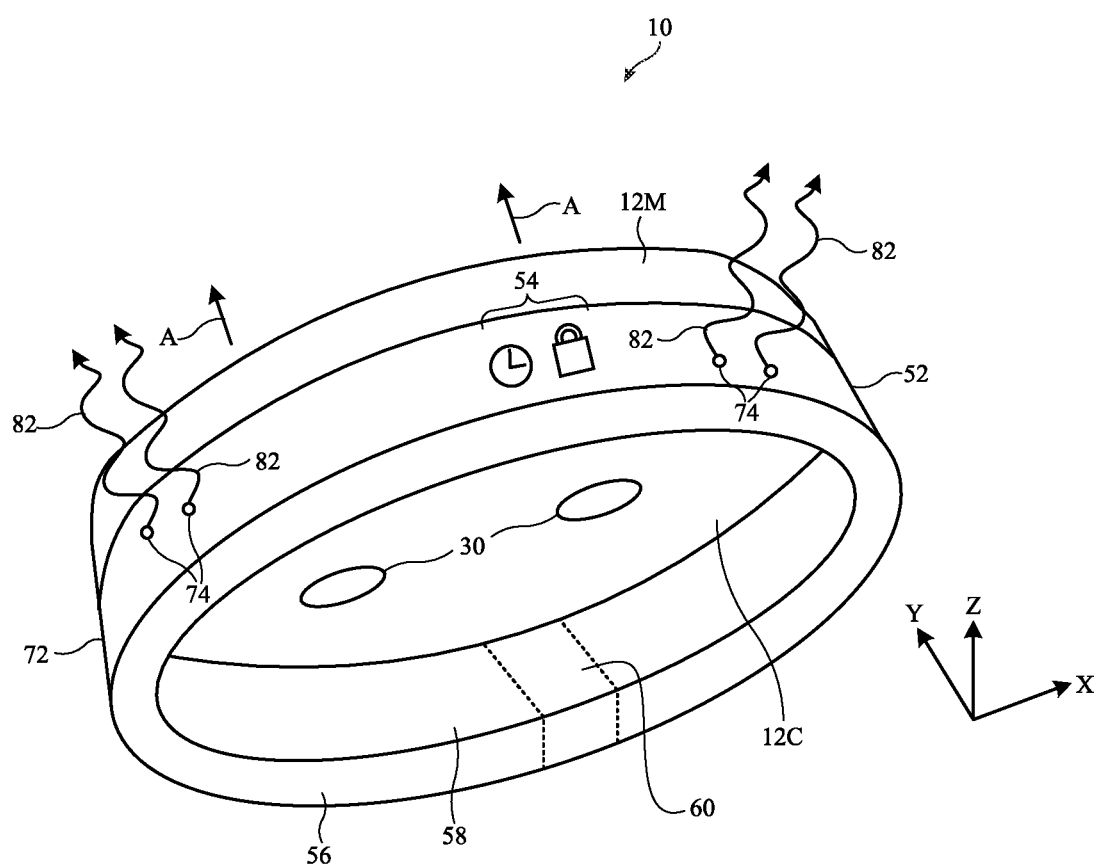
FIG. 4 is a perspective view of an illustrative head-mounted device having a fabric-covered light seal in accordance with an embodiment.

FIG. 4 is a perspective view of device 10 showing how a face frame may form a light seal around eye boxes 13 (FIG. 1) to help prevent outside light from leaking into the viewing area of head-mounted device 10. As shown in FIG. 4, device 10 may include main housing portion 12M which is configured to be mounted on a user's head. To help block outside light (e.g., ambient light in the user's environment that is not emitted by displays 14 of device 10) from entering the viewing area of head-mounted device 10 where eye boxes 13 are located, a light seal such as light seal 52 may be formed between main housing portion 12M and the user's face. For example, light seal 52 may extend between main housing portion 12M and temple housing portions 12T (FIG. 1) to help prevent light from entering any gaps between device 10 and the user's face.

Light seal 52 (sometimes referred to as face frame 52) may include one or more rigid structures such as a rigid internal frame member or other stiff structure and one or more flexible materials such as fabric, foam, polymer, or other suitable materials. For example, light seal 52 may include a ring-shaped or horseshoe-shaped frame that surrounds eye boxes 13 (FIG. 1) and that is covered by one or more layers of fabric. As shown in FIG. 4, light seal 52 may include one or more different fabric layers such as outer fabric layer 72, inner fabric layer 58, nose bridge fabric 60, and face fabric 56. Face fabric 56 may rest against the user's face when device 10 is worn on the user's head. Face fabric 56 may include one or more layers of foam covered in one or more layers of fabric (e.g., a warp knit fabric, a weft knit fabric, a spacer fabric, a woven fabric, and/or any other suitable fabric). Nose bridge fabric 60 may be formed from a stretchable textile to accommodate different nose shapes.

Outer fabric layer 72 may be a seamless tube of fabric that loops around the optical axes A of lenses 30 of optical modules 40. The optical axis A of each lens 30 extends parallel to the Y-direction of FIG. 4. Outer fabric layer 72 may form an outermost surface of device 10, if desired. Outer layer 72 may be formed from fabric such as knit fabric (e.g., warp knit fabric, weft knit fabric, etc.), woven fabric, spacer fabric (e.g., inner and outer knit layers separated by a gap and joined by a spacer layer such as a monofilament strand), braided fabric, and/or any other suitable fabric. In one illustrative arrangement, outer fabric layer 72 is a stretchable, seamless tube of weft knit fabric having a bird's eye pattern or other suitable two-color pattern (as an example). Arrangements in which outer layer 72 is formed from non-fabric materials such as polymer, silicone, or elastomer may also be used.

Inner fabric layer 58 may be a light-blocking fabric that lines the interior surface of outer fabric layer 72. Inner fabric layer 58 may include one or more layers of knit fabric, warp knit fabric, weft knit fabric, woven fabric, spacer fabric, braided fabric, and/or any other suitable type of fabric. It may be desirable to use dark-colored fabric for inner fabric layer 58 to help keep the viewing area around eye boxes 13 sufficiently dark while the user is viewing images on displays 14 of device 10. If desired, inner fabric layer 58 may include one or more dark-colored inner fabric layers on the viewing side (e.g., facing eye boxes 13 and lenses 30 of optical modules 40) and one or more light-colored outer fabric layers on the non-viewing side (e.g., facing outer fabric layer 72). Other arrangements may be used for inner fabric layer 58, if desired.

Head-mounted device 10 may include light-emitting fabric. For example, fabric-covered portions of device 10 may incorporate light-emitting devices to illuminate an exterior surface of head-mounted device 10. As shown in FIG. 4, for example, light seal 52 may incorporate light-emitting devices such as light-emitting devices 74. Light-emitting devices 74 may include single light-emitting diodes, one-dimensional or two-dimensional arrays of light-emitting diodes, lasers, optical fibers, light guides, light pipes, light guide films, light guide plates, and/or other light-emitting devices. Light-emitting devices 74 may emit visible light of any suitable color(s) for viewing by a user such as white light, red light, blue light, green light, yellow light, etc. Infrared light may also be emitted by light-emitting devices 74, if desired.

Light-emitting devices 74 may form status indicator lights, illuminated button icons, displays, illuminated regions associated with one or more input devices (e.g., touch sensors, buttons, switches, etc.), and/or other visual output devices. Light-emitting devices 74 may be embedded or otherwise incorporated into fabric in device 10, may be attached to an outer surface of fabric in device 10, may emit light 82 through openings in fabric of device 10, may be optical fibers or other light guides that form strands that are interlaced with other strands to form a layer of fabric in device 10, and/or may have other configurations in device 10.

Light-emitting devices 74 may be configured to emit light 82 and to thereby provide visual output such as visual output 54. Visual output 54 may be status indicator output, display content or other visual content such as emojis, text, video, graphics, user interface elements, icons, avatars, etc. If desired, visual output 54 may be coordinated with the display content on displays 14 of device 10. For example, visual output 54 may indicate what content is being displayed on display 14, may indicate whether the user wearing device 10 is busy, unavailable, etc., may include messages to outside viewers, may include status information such as battery level, time and date, user information, notifications, etc., and/or may include any other suitable visual content. Visual output 54 may also be useful for conveying information when device 10 is not being worn on any user's head. For example, visual output 54 may include a game summary or game statistics associated with a game that user has just finished playing on device 10, may include time and date information, may include a menu of options for adjusting the operating mode of device 10 in arrangements where light-emitting devices 74 overlap an input device such as a touch sensor or button (e.g., options to select which display content is displayed on display 14, options to turn device 10 on and off, options to adjust operational settings of device 10 such as display brightness, audio volume, etc.), and/or may be used to visually convey other information whether or not device 10 is being worn on a user's head.

In the example of FIG. 4, light-emitting devices 74 are incorporated into fabric of light seal 52. For example, light-emitting devices 74 may form one or more illuminated regions on outer fabric layer 72 of light seal 52. This is merely illustrative. If desired, light-emitting devices 74 may be integrated into other fabric portions of device 10 (e.g., on inner fabric layer 58, face fabric layer 56, nose fabric 60, curtain 12C, other fabric layers in device 10, etc.).

Figure 5:
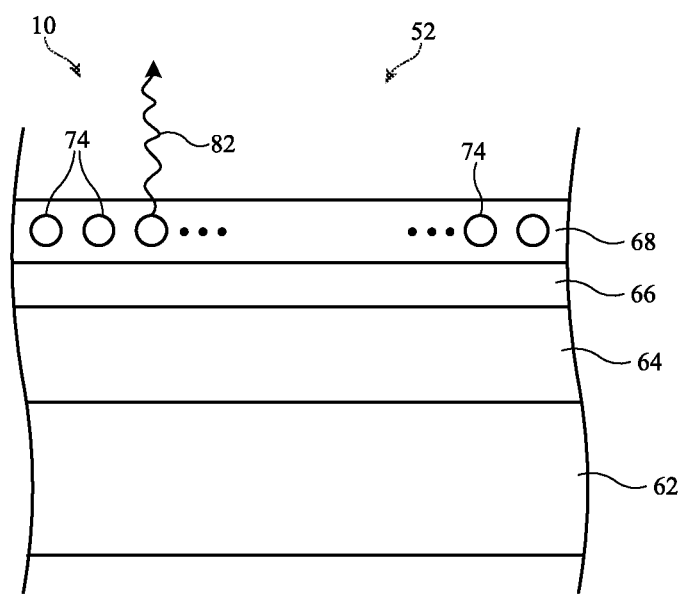
FIG. 5 is a cross-sectional side view of an illustrative head-mounted device having a removable outer fabric layer with light-emitting devices in accordance with an embodiment.

FIG. 5 is a cross-sectional side view of a portion of device 10 showing how light-emitting devices may be incorporated into a fabric-covered portion of device 10 such as light seal 52. In the example of FIG. 5, light seal 52 includes one or more internal frame members such as rigid frame member 62 (e.g., a lightweight and strong internal frame member formed from carbon fiber composites or other suitable materials), covered with one or more soft layers of material such as foam 64, polymer layer 66 (e.g., polyurethane, silicone, or other suitable material), and fabric layer 68. If desired, fabric layer 68 may be removable so that the user can remove the outermost layer 68 of light seal 52 for washing and/or to change for a different covering (e.g., with a different color, texture, user experience, etc.). Outer fabric layer 68 may form part of outer fabric layer 72 of light seal 52, inner fabric layer 58 of light seal 52, nose fabric 60 of light seal 52, face fabric layer 56 of light seal 52, another fabric layer of light seal 52, or a fabric layer in device 10 that does not form part of light seal 52. Arrangements in which fabric layer 68 is used to form outer fabric layer 72 of light seal 52 are sometimes described herein as an example.

Light-emitting devices 74 may be incorporated into fabric layer 68 to form one or more illuminated regions on fabric layer 68 for providing visual output such as visual output 54 (FIG. 4). Light-emitting devices 74 may be embedded within fabric 68, may include light-emitting diodes mounted directly on strands of fabric 68, may include light guides (e.g., optical fibers) that are intertwined (e.g., woven, knit, twisted, braided, or otherwise interlaced) with strands of fabric 68, may be located between first and second layers of fabric 68, may be located in one or more pockets inside of fabric 68, may be adhered or otherwise attached to an upper surface of fabric 68 (e.g., an outermost surface of light seal 52) or a lower surface of fabric 68 (e.g., between fabric 68 and polymer layer 66), and/or may otherwise be integrated into light seal 52 to create illuminated regions on fabric 68.

Light-emitting devices 74 may emit light 82 in any suitable direction, depending on where visual output is desired. For example, light-emitting devices 74 may emit light away from eye boxes 13 to form publicly viewable visual output 54 on the exterior surface of light seal 52 (e.g., so that users not wearing device 10 can view visual output 54 on the outside of device 10 while displays 14 are turned off or while displays 14 are presenting visual content to a user wearing device 10). In other arrangements, light-emitting devices 74 may emit light towards eye boxes 13 to form privately viewable visual output 54 on the interior surface of light seal 52 (e.g., so that the user wearing device 10 can view both visual output on displays 14 and visual output 54 emitted by light-emitting devices 74).

If desired, the interface between fabric 68 and polymer layer 66 may be free of adhesive so that fabric 68 can be removed by a user for washing and/or for changing to a different outer cover.

Figure 6:
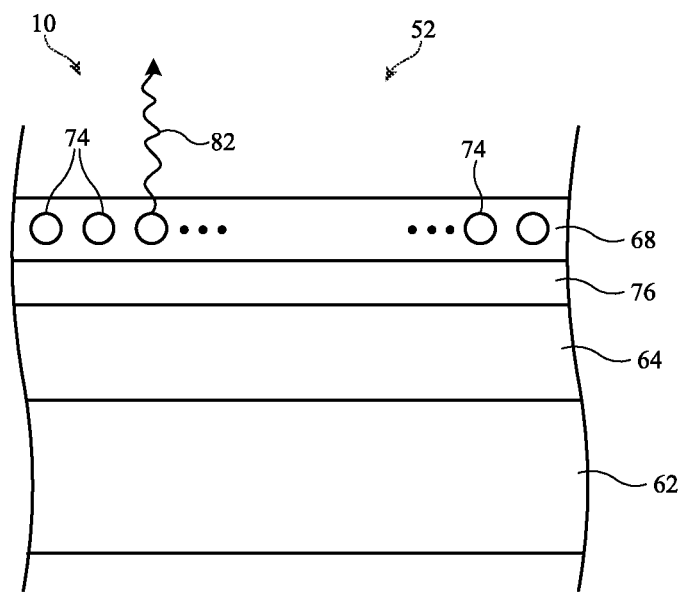
FIG. 6 is a cross-sectional side view of an illustrative head-mounted device having a fixed outer fabric layer with light-emitting devices in accordance with an embodiment.

In the example of FIG. 6, light-emitting fabric 68 has been fixed to internal frame member 62 using adhesive 76. With this type of configuration, fabric 68 may not be removable and may instead be permanently attached to light seal 52. Light-emitting devices 74 may form one or more illuminated regions on fabric 68 for providing visual output such as visual output 54 of FIG. 4.

Figure 7:
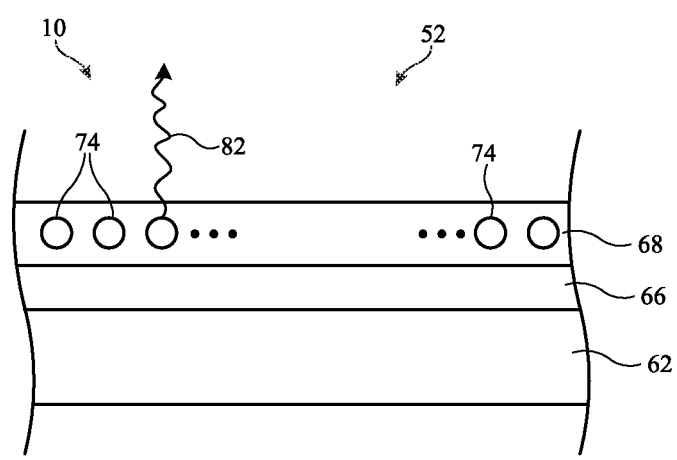
FIG. 7 is a cross-sectional side view of an illustrative head-mounted device having an outer fabric layer formed from spacer fabric in accordance with an embodiment.

In the example of FIG. 7, foam layer 64 has been omitted from light seal 52 and fabric 68 is directly attached to internal frame member 62 using adhesive 96. This may be useful in regions of light seal 52 where foam is not needed. If additional cushion is needed, fabric 68 may be formed from spacer fabric. A spacer fabric includes inner and outer fabric layers (e.g., weft knit layers, warp knit layers, woven layers, or other suitable fabric layers) joined by a middle spacer layer. The spacer layer may be a monofilament or multifilament strand that is interlaced back and forth with the inner and outer fabric layers and that is used to maintain a gap between the inner and outer fabric layers. This provides a soft, cushiony layer on the outer surface of light seal 52 so that foam may be omitted, if desired. This is merely illustrative, however. If desired, light seal 52 may include both an inner foam layer such as foam layer 64 and an outer spacer fabric layer for additional cushion. Light-emitting devices 74 may form one or more illuminated regions on fabric 68 for providing visual output such as visual output 54 of FIG. 4.

FIGS. 8-14 show different types of light-emitting devices that may be included in device 10 to form light-emitting fabric 68. Any one or more of these different types of light-emitting devices may be incorporated into light seal 52 (e.g., light seal 52 of FIGS. 4, 5, 6, and 7) and/or may be incorporated into fabric in other locations of device 10 to form light-emitting fabric.

Figure 8:
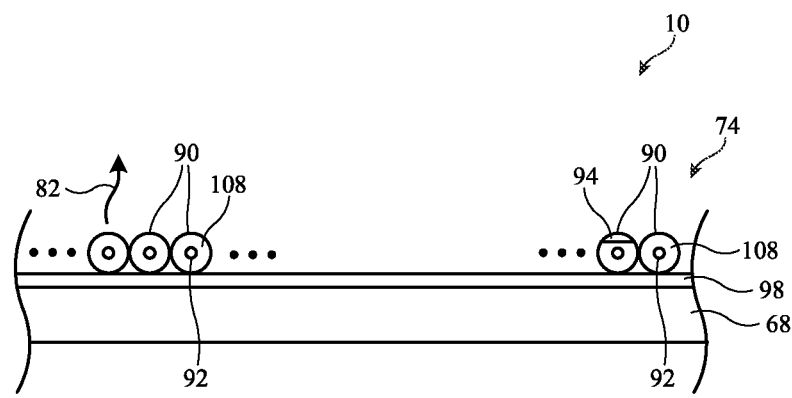
FIG. 8 is a cross-sectional side view of an illustrative head-mounted device having light-emitting devices such as light guides attached to an outer surface of an outer fabric layer in accordance with an embodiment.

In the example of FIG. 8, light-emitting devices 74 include light guides such as light guides 90 attached to an outer surface of fabric 68. Light guides 90 may include a core such as core 92 and a cladding such as cladding 108. With one illustrative configuration, light guides 90 are fiber-optic waveguides (sometimes referred to as optical fibers) formed from a core 92 of polymer or glass surrounded by a lower-index cladding 108 of polymer or glass. The optical fibers may be embedded in polymer or other material and/or may be directly attached to fabric 68. With another illustrative configuration, light guides 90 may be formed from molded polymer waveguide structures. These structures may include molded polymer cores 92 surrounded by molded polymer cladding 108. If desired, the cores 92 may be formed from a first shot of polymer and the cladding 108 may form a second, lower-refractive-index shot of polymer that surrounds the first shot.

Light guides 90 may be any suitable shape (e.g., thin elongated rods, elongated transparent members forming thick slabs or thin strip-shaped members, fibers, tapered blocks, conical shapes, and/or other shapes or combinations of these shapes). The cross-sectional shape of light guides 90 (e.g., the cross-sectional shape of an optical fiber, strip-shaped sheet of polymer, or other elongated waveguide) may be rectangular, circular, oval, square, may have other cross-sectional shapes with curved and/or straight edges, or may have other suitable shapes. Light-emitting devices 74 may include light sources such as light-emitting diodes, lasers, or other light sources that emit light into light guides 90. The light may be guided within cores 92 and propagated along the longitudinal axis of the light guide.

Light guides 90 may include light-scattering structures 94. Light-scattering structures 94 may include roughened surfaces, protrusions, recesses, embedded particles (e.g., solid or hollow microspheres, etc.), and/or other light-scattering features that are configured to scatter light 82 out of light guide 90 to form visual output 54 on one or more portions of light seal 52. The light-scattering structures 94 of light guides 90 may be configured to form alphanumeric characters, icons, or other suitable shapes or may be configured to form rectangular patches or patches of other shapes that backlight patterned opaque layers (e.g., black ink layers with alphanumeric openings and/or icon-shaped openings). Coating openings and light-scattering structures 94 may be formed on outwardly facing surfaces of light seal 52, inwardly facing surfaces of light seal 52, sidewall surfaces, and/or other suitable surfaces light seal 52.

Light guides 90 may be attached to the outer surface of fabric 68 using an adhesive such as adhesive 98. Light guides 90 may emit light 82 away from eye boxes 13 towards a user who is not wearing device 10 (e.g., in arrangements where light-emitting devices 74 are formed on an exterior surface of light seal 52 facing away from eye boxes 13) or may emit light 82 towards a user who is wearing device 10 (e.g., in arrangements where light-emitting devices 74 are formed on an interior surface of light seal 52 facing towards eye boxes 13).

Figure 9:
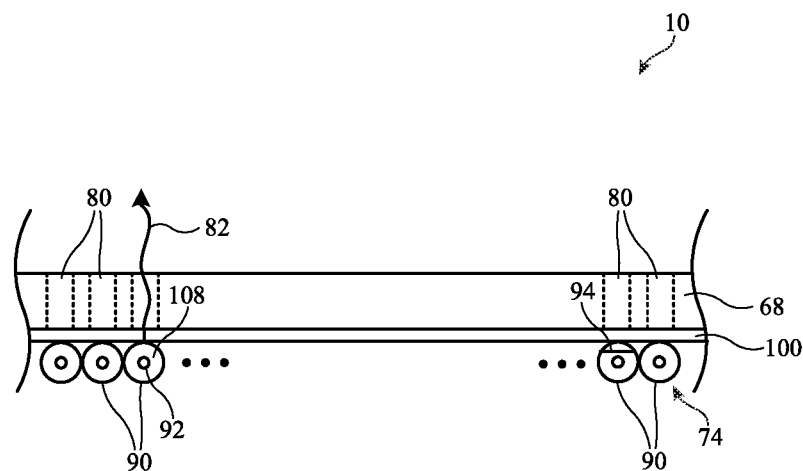
FIG. 9 is a cross-sectional side view of an illustrative head-mounted device having light-emitting devices such as light guides that emit light through an outer fabric layer in accordance with an embodiment.

In the example of FIG. 9, light guides 90 are attached to an interior surface of fabric 68 and are used to emit light 82 through fabric 68. As shown in FIG. 9, an adhesive such as adhesive 100 may be used to attach light guides 90 to the interior surface of fabric 68. Light guides 90 may emit light through openings 80 in fabric 68. Openings 80 may be naturally occurring gaps between individual strands that make up fabric 68, may be gaps between strands that are specifically created to align with light-scattering structures 94 of light guides 90 (e.g., by creating regions of fabric 68 that have a lower strand density, a looser knit, looser weave, etc.), may be laser-drilled holes or laser-ablated openings, may be transparent portions of fabric 68 (e.g., portions formed from transparent polymer strands), and/or may be any other suitable openings in fabric 68 for allowing light 82 to pass through fabric 68.

Figure 10:
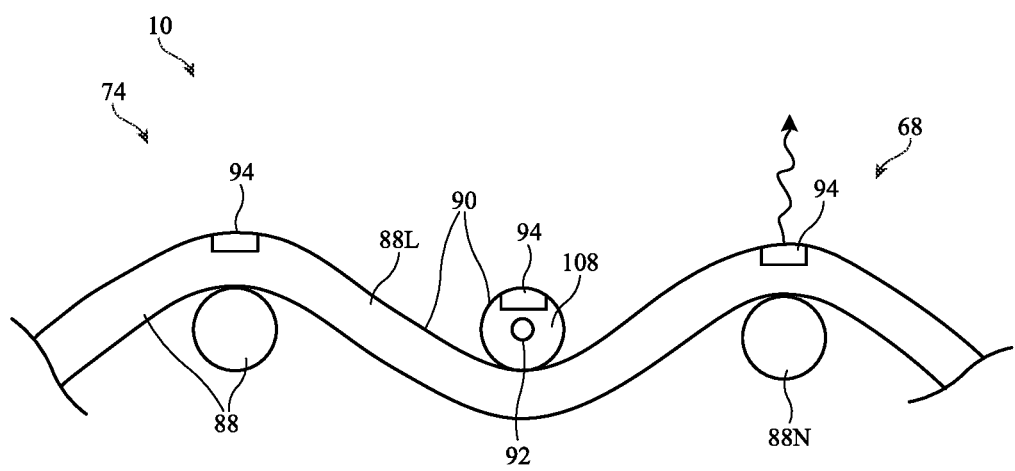
FIG. 10 is a cross-sectional side view of an illustrative head-mounted device having light guides that form strands in a layer of fabric in accordance with an embodiment.

FIG. 10 shows an illustrative example in which light-emitting devices 74 are formed from wave guides that form strands in a layer of fabric. As shown in FIG. 10, light-emitting devices 74 may include light guides 90. Each light guide 90 may include core 92 and cladding 108, as discussed in connection with FIG. 8. Light sources such as light-emitting diodes may emit light 82 into cores 92 of light guides 90. Each light guide 90 may guide light 82 along the longitudinal axis of the light guide. Light-scattering structures 94 may be formed in select locations of cladding 108 of light guides 90 so that light 82 escapes from core 92 through cladding 108 to form visual output 54.

Fabric 68 may include strands 88. Some strands 88 such as strands 88N may be non-light-emitting strands that do not emit or guide light. Other strands such as strands 88L may be formed by light guides 90 and may be configured to guide and emit light. For example, light guides 90 may be formed from thin, flexible strands that can be woven, knit, braided, or otherwise interlaced with other strands 88 to form fabric 68. In the example of FIG. 10, strands 88 including non-light-emitting strands 88N and light-emitting strands 88L formed from light guides 90 are woven together to form fabric 68. Light-emitting devices 74 such as light guides 90 may emit light 82 in regions where light-scattering structures 94 are located.

Figure 11:
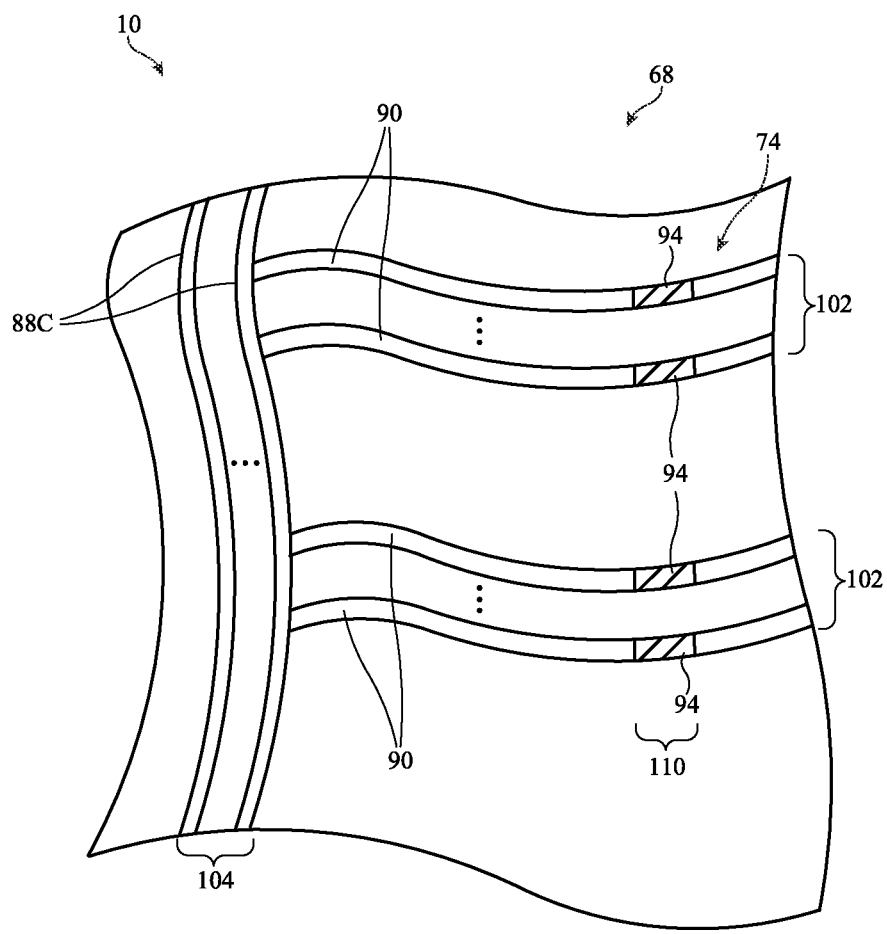
FIG. 11 is a top view of an illustrative layer of fabric in a head-mounted device having conductive strands coupled to light-emitting devices in the layer of fabric in accordance with an embodiment.

FIG. 11 is a top view of fabric 68 having light-emitting devices 74 such as light guides 90 of FIG. 8, light guides 90 of FIG. 9, and/or light guides 90 of FIG. 10. As shown in FIG. 11, light guides 90 may be located in regions of fabric 68 such as regions 102. Light-scattering structures 94 may form light-emitting regions 110 on fabric 68. There may be a single, continuous light-emitting region 110 on fabric 68, or there may be multiple non-contiguous light-emitting regions 110 on fabric 68. Some light-emitting regions 110 of fabric 68 may be separated from each other by an intervening non-light-emitting area, if desired.

Light-emitting devices 74 may be controlled by control circuitry 20 (FIG. 3). Control circuitry 20 may, for example, include control lines such as control lines 88C in region 104 of fabric 68. Control lines 88C may be formed from conductive strands of material that are intertwined with other strands 88 in fabric 68, or control lines 88C may be formed from metal traces that are electroplated or otherwise formed on the surface of fabric 68. Control lines 88C may provide control signals to light-emitting devices 74 (e.g., light-emitting diodes or other light sources that emit light into light guides 90). If desired, each light source may be independently controlled so that some light-emitting regions 110 may be illuminated while other light-emitting regions 110 are not illuminated. Control lines 88C may be formed in an edge region of fabric 68 such as edge region 104. Control lines 88C in region 104 may be coupled to a signal bus (e.g., a flexible printed circuit cable or other signal path) that conveys signals between control lines 88C on fabric 68 and control circuitry 20 in main housing unit 12M or in any other suitable location of device 10.

During operation, control circuitry 20 may use control lines 88C to send control signals to light-emitting devices 74 to emit light 82 to form icons, alphanumeric characters, or other shapes to provide visual output for a user. The visual output may be associated with the status of operation of device 10 (e.g., battery status, power status, sleep status, wireless charging status, wireless signal strength status, wireless local area network status) and/or other suitable status (unread message status, voice mail status, etc.). Visual output may be independent from the visual output on displays 14 or may be coordinated with (or dependent upon) the visual output on displays 14. Visual output may be used to convey messages or other information to users not wearing device 10. Visual output may serve to provide a user with notifications. For example, flashing light output can be provided to alert a user about an event associated with an application running on device 10 (e.g., an event in a virtual reality application running on device 10). In other configurations, light output may be provided to serve as feedback. For example, when a user touches a touch sensor on the surface of device 10 (e.g., a capacitive touch sensor, optical touch sensor, or other touch sensitive component that is overlapped by fabric 68), control circuitry 20 in device 10 can modulate light-emitting devices 74 and thereby create a flash of emitted light 82 that serves as a visual confirmation that the touch input has been received.

The use of light guides such as light guides 90 as light-emitting devices 74 is merely illustrative. In addition to or instead of using light guides 90, light-emitting devices 74 may include discrete light-emitting devices such as discrete light-emitting diodes that emit light directly from or through fabric 68 to form visual output 54. This type of arrangement is illustrated in FIGS. 12 and 13.

Figure 12:
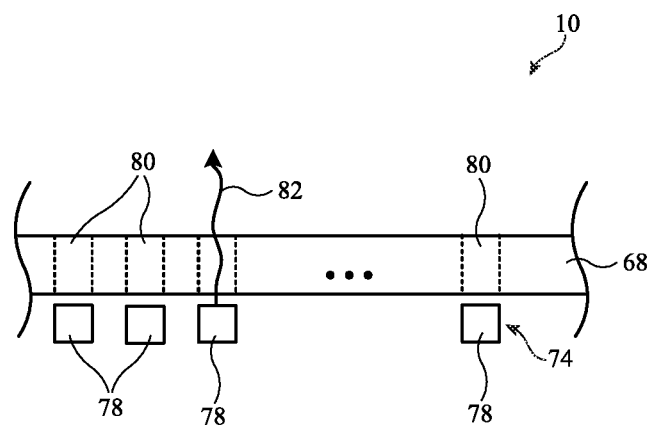
FIG. 12 is a cross-sectional side view of an illustrative head-mounted device having light-emitting devices that emit light through openings in a layer of fabric in accordance with an embodiment.

As shown in FIG. 12, light-emitting devices 74 may include light sources 78. Light sources 78 may include one or more light-emitting diodes, one or more lasers, lamps, electroluminescent devices, and/or other light-emitting components. Light sources 78 may be mounted in alignment with openings 80 in fabric 68 so that light 82 emitted by light sources 78 passes through fabric 68 to form visual output on the outer surface of fabric 68. Openings 80 may be naturally occurring gaps between individual strands that make up fabric 68, may be gaps between strands that are specifically created to align with light sources 78 (e.g., by creating regions of fabric 68 that have a lower strand density, a looser knit, looser weave, etc.), may be laser-drilled holes or laser-ablated openings, may be transparent portions of fabric 68 (e.g., portions formed from transparent polymer strands), and/or may be any other suitable openings in fabric 68 for allowing light 82 to pass through fabric 68. Light sources 78 may be mounted to a common printed circuit substrate, may share a common housing, or may be individually packaged light-emitting diodes. There may be a one-dimensional array of light sources 78, a two-dimensional array of light sources 78, and/or discrete groups of light sources 78 that are provided in different regions of fabric 68.

Figure 13:
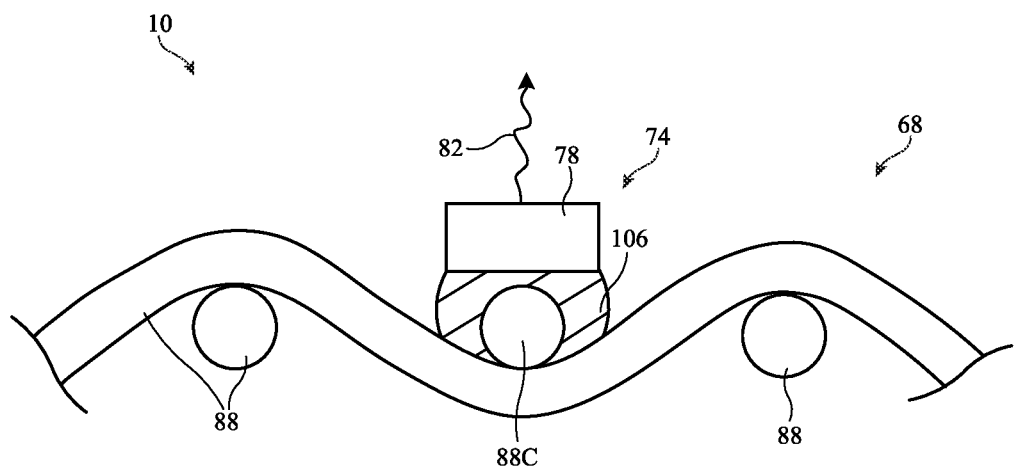
FIG. 13 is a cross-sectional side view of an illustrative head-mounted device having a layer of fabric with a light-emitting device mounted to a strand in the fabric in accordance with an embodiment.

In the example of FIG. 13, light sources such as light source 78 are mounted directly to strands in fabric 68. If desired, light sources 78 may be electrically coupled to conductive strands in fabric 68 such as conductive strand 88C. For example, conductive material such as solder 106 (or other suitable conductive material) may be used to electrically and mechanically couple light source 78 to conductive strand 88C. During operation, conductive strand 88C may convey control signals from control circuitry 20 to light source 78 to emit light 82 and thereby form visual output 54 on light seal 52 or other fabric-covered portions of device 10.

Figure 14:
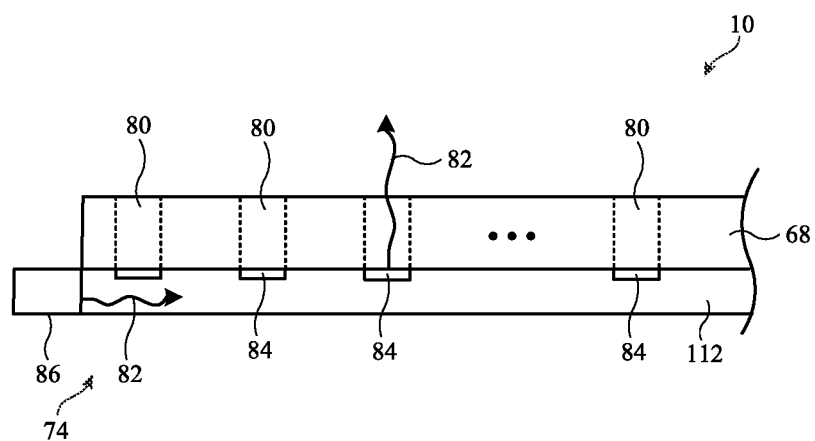
FIG. 14 is a cross-sectional side view of an illustrative head-mounted device having a light guide layer that emits light through openings in a layer of fabric in accordance with an embodiment.

FIG. 14 shows an illustrative arrangement in which light-emitting devices 74 include one or more light sources and a light guide member that guides light via total internal reflection. As shown in FIG. 14, light-emitting devices 74 may include one or more light sources such as light source 86 and a light guide member such as light guide layer 112. Light source 86 may be optically coupled to member 112.

For example, light source 86 may include one or more light-emitting devices (e.g., visible and/or infrared light-emitting diodes, lasers, etc.) that are coupled to member 112 by embedding light source 86 in member 112 (e.g., by molding the polymer material of member 112 over light source 86), by pressing light source 86 against an exposed edge of member 112, by mounting an output surface of light source 86 adjacent to an opposing input surface of member 112, or by otherwise configuring structure 112 so that light 82 that is emitted from light source 86 into the interior of member 112. Light 82 in member 112 may travel along the length of member 112 in accordance with the principle of total internal reflection. For example, member 112 may form a planar light guide (waveguide) that guides light in accordance with the principal of total internal reflection. Light may also be confined using metallic coatings (e.g., a reflective layer formed on one or more surfaces of member 112) and other light guide isolation structures.

Light guide member 112 may include light-scattering structures such as light-scattering structures 84. Light-scattering structures 84 may be protrusions (ridges, bumps, etc.), recesses (grooves, pits, etc.), and/or embedded particles (solid or hollow microspheres, etc.) that are configured to scatter light 82 out of member 112.

Fabric 68 may overlap light guide member 112 and may have openings 80 aligned with light-scattering structures 84. Openings 80 may be naturally occurring gaps between individual strands that make up fabric 68, may be gaps between strands that are specifically created to align with light-scattering structures 84 (e.g., by creating regions of fabric 68 that have a lower strand density, a looser knit, looser weave, etc.), may be laser-drilled holes or laser-ablated openings, may be transparent portions of fabric 68 (e.g., portions formed from transparent polymer strands), and/or may be any other suitable openings in fabric 68 for allowing light 82 to pass through fabric 68.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
   a head-mounted housing;
   a display supported by the head-mounted housing and configured to display images that are viewable from an eye box;
   a light seal at least partially surrounding the eye box, wherein the light seal comprises fabric with openings; and
   light-emitting devices configured to emit light through the openings to produce visual output on the fabric.

2. The head-mounted device defined in claim 1 wherein the light-emitting devices comprise optical fibers.

3. The head-mounted device defined in claim 2 wherein the fabric comprises strands and wherein the optical fibers are interlaced with the strands.

4. The head-mounted device defined in claim 3 wherein the strands comprise conductive strands configured to convey control signals to the light-emitting devices.

5. The head-mounted device defined in claim 2 wherein the optical fibers each comprise a core surrounded by a cladding and wherein the cladding includes light-scattering features to scatter light out of the core.

6. The head-mounted device defined in claim 5 wherein the light-scattering features are aligned with the openings.

7. The head-mounted device defined in claim 1 wherein the light seal comprises a layer of foam and wherein the fabric covers the layer of foam.

8. The head-mounted device defined in claim 7 wherein the fabric is removable.

9. The head-mounted device defined in claim 1 wherein the visual output on the fabric is coordinated with the images on the display.

10. The head-mounted device defined in claim 1 wherein the fabric is a spacer fabric.

11. A head-mounted device, comprising:
    a housing;
    a display mounted in the housing configured to display image content;
    a fabric coupled to the housing and forming an outer surface of the head-mounted device;
    a light-emitting device that overlaps the fabric and is configured to produce an illuminated region on the fabric; and
    control circuitry configured to control the light-emitting device based on the image content on the display.

12. The head-mounted device defined in claim 11 wherein the fabric comprises strands and wherein the light-emitting device comprises a light-emitting diode mounted to a given one of the strands.

13. The head-mounted device defined in claim 11 wherein the light-emitting device comprises a light guide and a light source that emits light into the light guide and wherein the light guide has light-scattering features that scatter the light out of the light guide to create the illuminated region.

14. The head-mounted device defined in claim 13 wherein the light guide forms a strand in the fabric.

15. The head-mounted device defined in claim 13 wherein the fabric has an opening and wherein the light-scattering features are aligned with the opening such that the light is scattered out of the light guide and through the opening.

16. A head-mounted device, comprising:
    a main housing unit;
    a display in the main housing unit configured to display images;
    an optical module in the main housing unit through which the images are viewable from an eye box; and
    a light seal at least partially surrounding the eye box, wherein the light seal comprises a light-emitting fabric having strands and configured to emit light through the strands to provide visual output in a direction away from the eye box.

17. The head-mounted device defined in claim 16 wherein the light-emitting fabric comprises light guides with light-scattering structures that scatter light out of the light-emitting fabric.

18. The head-mounted device defined in claim 16 wherein the light-emitting fabric comprises light-emitting diodes that emit light through the light-emitting fabric.

19. The head-mounted device defined in claim 18 further comprising control circuitry configured to adjust the visual output based on the images on the display.

20. The head-mounted device defined in claim 16 wherein the light-emitting fabric comprises light-emitting devices and conductive strands that provide control signals to the light-emitting devices.

* * * * *